Feb. 10, 1931  W. A. NELLER  1,791,902
REAMER
Filed July 26, 1928
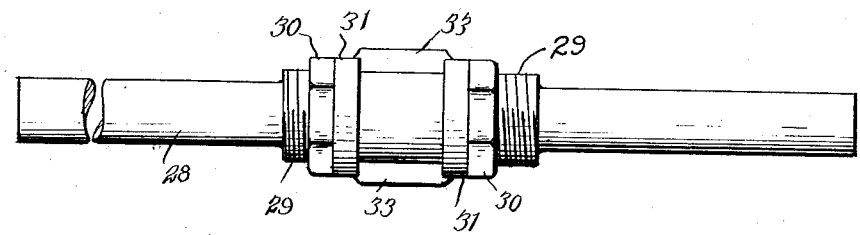
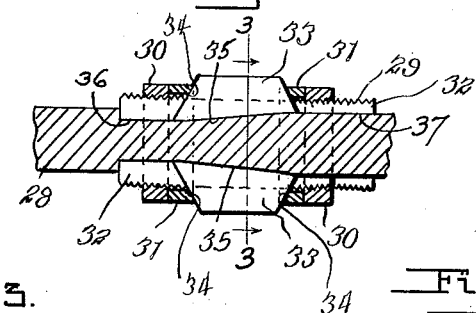
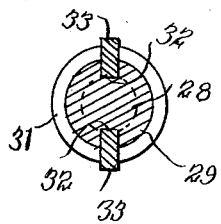 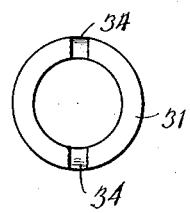
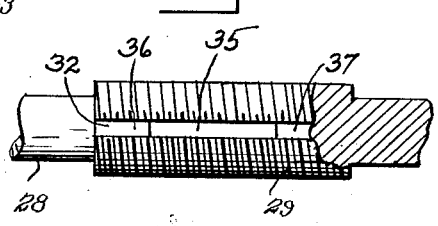
Inventor
W. A. Neller

UNITED STATES PATENT OFFICE

WALTER A. NELLER, OF WOODLAND, CALIFORNIA

REAMER

Application filed July 26, 1928. Serial No. 295,480.

This invention relates to a reamer for truing and enlarging the openings in the bosses of pistons for internal combustion engines to receive the wrist pin whereby the rod is connected to the piston.

While the drawing illustrates a preferred embodiment of the invention, it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof, reference is to be had in the following description and the drawing hereto attached, in which:—

Figure 1 is a side view of the reaming tool, an intermediate portion of the spindle being broken away.

Figure 2 is a central, longitudinal sectional view of the intermediate portion of the reamer.

Figure 3 is a transverse sectional view on the line 3—3 of Figure 2.

Figure 4 is an inner face view of one of the washers.

Figure 5 is a detail view of the intermediate portion of the spindle, the blade, washers and nuts being removed.

Corresponding and like parts are referred to in the following description and designated in the several views of the drawing by like reference characters.

The reaming tool comprises a spindle 28 formed with an enlarged portion 29 which is externally screw-threaded to receive nuts 30 and washers 31. Longitudinal grooves 32 are formed in the sides of the enlarged portion 29 and provide seats to receive blades 33. The bottoms of the grooves 32 are inclined, as indicated most clearly in Figure 2, whereby to effect outward adjustment of the blades 33 as they are moved longitudinally of the spindle 28. The inner edges of the blades 33 are inclined to correspond with the inclined bottoms of the grooves 32, so that movement of the blades lengthwise of the spindle with their inner edges in contact with the bottoms of the grooves will result in lateral adjustment of the blades to vary the diameter and taper of the cutting portion of the reamer to coincide with the required diameter of the openings formed in the bosses of the pistons. Usually two blades 33 are provided and the blades are oppositely disposed, and their ends are received in notches 34, formed in the washers 31, said blades being clamped by tightening the nuts 30. The blades may be adjusted laterally by backing one of the nuts 30 and advancing the opposite nut, pressure being applied to the outer edges of the blades to move their inner edges in contact with the inclined bottoms of the grooves 32.

It is observed that the bottom, or inner wall, of each of the grooves 32 includes three distinct portions, an intermediate inclined portion 35 and straight end portions 36 and 37 parallel with the circumference of the enlarged part 29 but at different distances from the axis thereof. This admits of a tilting of the blades 33 which, in effect, produces a tapered reamer to facilitate the entrance of the tool in an opening to be reamed. The blades may be adjusted to run parallel to a given position, or tilted, so that their outer cutting edges will incline in opposite directions, producing in effect a tapered or conical reamer, the smaller end of which may be readily introduced into an opening to be reamed.

The inner ends or bottoms of the notches 34 are inclined to receive the beveled ends of the blades 33, thereby preventing displacement of the blades when either one of the clamp nuts 30 is backed. When the clamp nuts 30 are tightened the inclined ends of the notches 34 ride upon the beveled ends of the blades 33 and draw the blades into the grooves 32 tight against the inner walls thereof as will be readily appreciated.

Having thus described the invention, I claim:—

A reaming tool comprising a spindle having longitudinal grooves in opposite sides and externally threaded opposite the grooves, the bottom of each of the grooves comprising an intermediate inclined portion and straight end portions which are disposed at different distances from the axis of the spindle, blades in said grooves, and means on the threaded portion of the spindle and coacting with the threads thereof to adjust the blades in the grooves to produce a variable cylindrical or tapered reamer within certain limits.

In testimony whereof I affix my signature.

WALTER A. NELLER. [L. S.]